No. 842,749. PATENTED JAN. 29, 1907.
G. T. BAGULEY.
BROILER.
APPLICATION FILED JAN. 2, 1906.
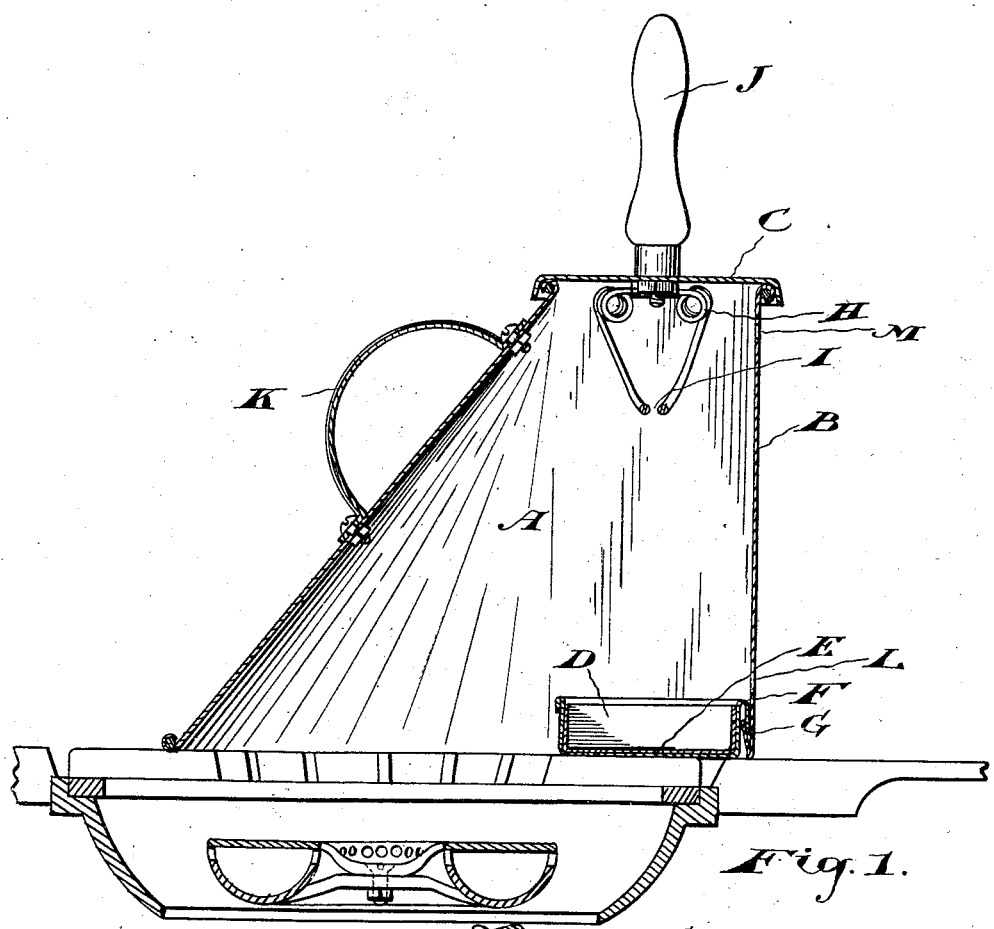
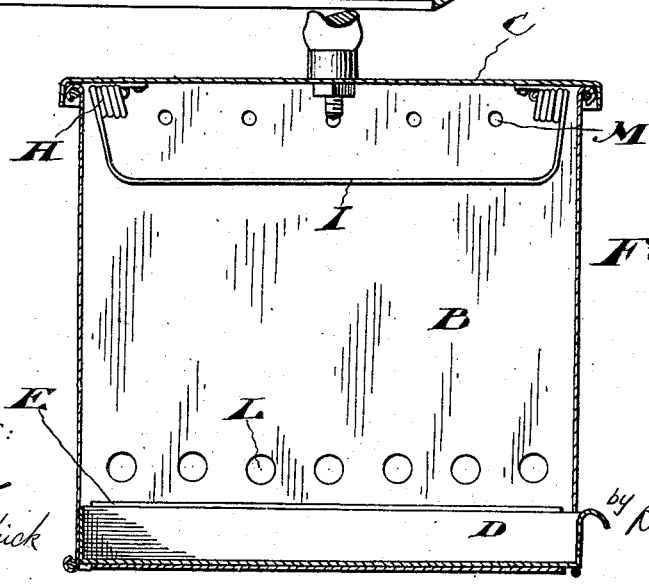
WITNESSES:
INVENTOR.
G. T. Baguley
by Ridout Maybee
ATTORNEYS

UNITED STATES PATENT OFFICE.

GEORGE T. BAGULEY, OF TORONTO, ONTARIO, CANADA.

BROILER.

No. 842,749.

Specification of Letters Patent.

Patented Jan. 29, 1907.

Application filed January 2, 1906. Serial No. 294,160.

*To all whom it may concern:*

Be it known that I, GEORGE T. BAGULEY, of the city of Toronto, in the Province of Ontario, Canada, have invented certain new and useful Improvements in Broilers, of which the following is a specification.

My object is to devise a broiler by means of which meat may be properly broiled over a gas-burner or other heater without danger of burning and without producing a disagreeable smell; and my invention consists, essentially, of a chamber having an opening in the bottom adapted to fit over the source of heat, the chamber being shaped to deflect the heated air from the said source toward one side of the chamber, which is provided with means for supporting the meat in a vertical position and with a drip-pan below the meat-supporting means, substantially as hereinafter more specifically described and then definitely claimed.

Figure 1 is a vertical section of my improved broiler. Fig. 2 is a vertical sectional elevation looking toward the right-hand in Fig. 1.

In the drawings like letters of reference indicate corresponding parts in the different figures.

A is the body of the broiler, comprising a chamber shaped substantially as a right-angled prism with the apex cut off. Its vertical wall B is preferably rectangular, as shown in Fig. 2. The bottom of this chamber is open, and the top is adapted to be closed by a removable cover C.

The dimensions of the chamber are such that the opening in its bottom will extend over the burner of a gas-stove or other suitable source of heat and at the same time provide room for a drip-pan D to one side of the source of heat. This drip-pan is supported on a guide E, detachably secured to the wall B by means of a hooked lip F, which is adapted to engage a strip G, secured to the said wall.

The drip-pan is inserted or withdrawn through an aperture in the end wall. (See Fig. 2.)

The cover C has meat-holding means secured to its under side. While various arrangements might be employed, I prefer to employ a pair of wire springs H, secured to the under side of the lid and shaped to form wire jaws I, between which the meat may be gripped. The upper side of the cover is provided with a handle J. A handle K is also preferably secured to the body of the broiler.

Close to the bottom of the vertical wall B, just above the drip-pan, I provide a series of air-exit holes L. A similar series of small holes K are also provided close to the top of this wall for the escape of steam.

The operation of the device is as follows: The cover is removed and the meat to be broiled gripped between the jaws I. The cover is then replaced and the body of the receptacle moved to bring its inclined wall above the gas-burner or other source of heat. The heated air of the source of heat is reflected inwardly against the side of the meat and passes over the top of the same and down the vertical wall, finally escaping through the holes L.

I find in practice that by causing heated air to travel round the meat in the manner described both sides are equally well done without the necessity of turning the meat, though this is easily done, if necessary, by reversing the position of the cover. The drip-pan receives any droppings from the meat, and as this drip-pan is to one side of the source of heat the fat and juices are not burned.

It will be found that with my device a steak or other meat may be broiled to perfection without any danger of burning it or without producing the disagreeable odor associated with ordinary broiling apparatus.

What I claim as my invention is—

1. A broiler comprising a chamber having an opening in the bottom adapted to afford communication with a source of heat, and having one side inclined from the bottom inwardly toward the opposite side in combination with means adjacent to the latter side, and to one side of the source of heat, for supporting the meat to be broiled in a vertical position, openings being provided in the said side above the drip-pan for the escape of the heated air, substantially as described.

2. A broiler comprising a chamber having an opening in the bottom, and having one side inclined from the bottom inwardly toward the opposite side in combination with means adjacent to the latter side for supporting the meat to be broiled; a drip-pan removably supported below the meat-supporting means, and air-exit apertures being provided in the side of the chamber just above the drip-pan, substantially as described.

3. A broiler comprising a chamber having an opening in the bottom, and having one side inclined from the bottom inwardly toward the opposite side, in combination with a cover removably fitted to an opening in the top of the chamber adjacent to the latter side; and means connected with said cover for supporting the meat to be broiled, substantially as described.

4. A broiler comprising a chamber having an opening in the bottom, and having one side inclined from the bottom inwardly toward the opposite side in combination with means adjacent to the latter side for supporting the meat to be broiled; a drip-pan removably supported below the meat-supporting means, and air-exit apertures being provided in the side of the chamber just above the drip-pan, and small apertures near the top of the same side, substantially as described.

5. A broiler comprising a chamber having an opening in the bottom, and having one side inclined from the bottom inwardly toward the opposite side in combination with means adjacent to the latter side for supporting the meat to be broiled; a guide detachably supported below the meat-supporting means opposite an aperture in an end of the chamber; and a drip-pan supported on the said guide, and removable through the said aperture, substantially as described.

6. A broiler comprising a closed chamber having an opening in the bottom adapted to afford communication with a source of heat, and shaped to direct heated air entering the opening toward one side of the chamber, in combination with means adjacent to the said side, and to one side of the source of heat, for supporting the meat to be broiled in a vertical position, openings being provided in the said side above the drip-pan for the escape of the heated air, substantially as described.

7. A broiler comprising a closed chamber having an opening in the bottom; a drip-pan at the bottom; a cover closing an opening over the drip-pan; and meat-holding means connected to the cover, substantially as described.

Toronto, December 28, 1905.

GEORGE T. BAGULEY.

In presence of—
J. EDW. MAYBEE,
JOHN G. RIDOUT.